United States Patent

Garland et al.

[11] Patent Number: 5,995,601
[45] Date of Patent: Nov. 30, 1999

[54] AUTOMATIC REMOTE METER READING SYSTEM AND METHOD EMPLOYING SELECTABLE LINE INTERFACE

[75] Inventors: Stuart M. Garland, Morton Grove; David B. Smith, Hinsdale, both of Ill.

[73] Assignee: Lucent Technologies, Inc., Murry Hill, N.J.

[21] Appl. No.: 09/164,153

[22] Filed: Sep. 30, 1998

[51] Int. Cl.⁶ ................................................. H04M 11/00
[52] U.S. Cl. ................................ 379/106.03; 340/870.02
[58] Field of Search ........... 379/106.01, 106.03–106.11; 340/870.01, 870.02

[56] References Cited

U.S. PATENT DOCUMENTS 5,682,422  10/1997  Oliver ................................ 379/106.03

Primary Examiner—Wing Fu Chan

[57] ABSTRACT

An automatic metering information collection system and method in which a remotely controllable line multi-interface at a customer's local multi-interfacing multiport switch responds to an interface selection message from a metering information collection computer at a utility service provider location to connect the hybrid digital/analog customer telephone line to a selected one of a plurality of available interfaces compatible with the type of interface employed by the meter until the metering information is conveyed to the collection computer and then automatically returns the customer's line to a default interface used by the other types of telephonic equipment on the customer's line.

24 Claims, 4 Drawing Sheets

AUTOMATIC REMOTE METER READING SYSTEM AND METHOD EMPLOYING SELECTABLE LINE INTERFACE

BACKGROUND OF THE INVENTION

This invention generally relates to methods and systems for reading utility consumption meters, such as natural gas and electricity meters, and more particularly to such methods and systems that obtain meter information automatically by telemetering the information via telephonic communication linkages with the meters to be read.

The cost for utility services such as provision of water, natural gas and electricity delivered directly via a conduit from the source to the customer's premises or site are charged based on consumption as measured by consumption meters, or meters, located at the customer's premises. It is known to interface these meters with the utility service provider via a telephone network connected via a customer's telephone line, or customer line, to the meter. Often there is only one line or one type of line at the customer's premises. In such cases, the customer line connected to the meter is the same customer line employed by the customer's voice telephone as well as other telephonic equipment at the customer's premises. Reference should be made to U.S. Pat. No. 5,182,766 issued Jan. 26, 1993 to Garland for "Generalized Telecommunications Customer Signaling Arrangement"; U.S. Pat. No. 5,189,694 issued to Garland on Feb. 23, 1993 for "Telemetry Access Arrangement"; U.S. Pat. No. 5,394,461 issued to Garland on Feb. 28, 1995 for "Telemetry Feature Protocol Expansion"; and U.S. Pat. No. 5,509,054 issued to Garland on Apr. 16, 1996 for "Communication Switching System", which patents are hereby incorporated by reference, for the details of such methods and systems.

While these systems and methods work successfully, the inventor has now determined that there are some shortcomings that arise when the customer line has a type of service, or type of interface, that is incompatible with the type of telephonic interface of the customer meter presently installed or intended to be installed at the customer site. This potentially arises whenever there is at least one customer line that is shared by the automatic telemetering meter and the voice telephone and other telephonic equipment at the customer's premises.

So long as the voice telephone and the meter require the same interface there is no apparent problem except that meters with different types of interfaces must be produced and inventoried. In such case, if the customer line is a digital line and a meter that also requires a digital interface is installed or if the customer line is an analog line being serviced by an analog interface then a meter having an analog interface is installed.

However, if after the installation of either a digital interfacing meter or an analog interfacing meter is installed, the customer changes the type of service on the line from digital to analog or from analog to digital then, of course, the meter becomes disabled from communicating through the telecommunication network and, in effect, fails to function at least as an automatic meter with telemetering capability. Once the customer line has been changed to a type of interface with which the meter is compatible the only way that telemetering capability can be restored is by replacing the meter with another one that is compatible. Disadvantageously, this new meter is also subject to the same problem should the customer choose to change the customer line back to the original service with which the original meter was compatible but with which the new meter is not.

Meters with a digital interface are preferred over meters with an analog interface due to enhanced speed and data transmission reliability for telemetering data. However, unfortunately most customer lines are analog lines and thus cannot be used in most single customer line situations.

SUMMARY OF THE INVENTION

In accordance with the present invention, the forgoing problems are overcome by provision of a method of automatically collecting metering information in which the type of service being provided on the customer line is selected to be compatible with the interface of the meter at the customer's premises by the utility service provider regardless of what type of regular telephonic service has been selected by the customer for use by the voice telephone or other telephonic equipment on the customer line.

This method enables use of the preferred digital interfacing meters with the many analog customer lines with which they previously could not be used, eliminates the need to inventory two different types of interfacing meters. In addition, the problem of meter disablement resulting from the customer changing the type of regular service for the customer line after installment of the meter is overcome. If the regular interface for the customer line is not compatible with the interface of the meter, then the interface for the customer line is temporarily changed during the telemetry of the meter information to an interface that is compatible with that of the meter.

In the preferred method of the invention, metering information is automatically collected from at least one consumption meter of a plurality of remote consumption meters individually located at and respectively connected with customer telephone lines at a plurality of different customer locations, by performance of the steps of: connecting a metering information collecting computer to a local multiport telecommunications switch that services the customer telephone line connected with the at least one consumption meter; sending from the information collecting computer an interface selection message to the local multiport switch representative of a selected one interface of a plurality of different types of available interfaces; interfacing the customer telephone line connected with the at least one consumption meter to the information collecting computer through the one selected interface represented by the interface selection message; and transmitting customer metering information from the at least one consumption meter through the one selected interface to the information collecting computer. The step of connecting includes the step of placing a call from the metering information collection computer to the customer telephone line and the step of connecting includes the step of establishing a communications link between the local multiport switch and the metering information collecting computer through a computer internet, preferably the world wide web internet.

Preferably, the different types of available interfaces from which one is selected include an analog interface and a digital interface. The customer line is automatically interfaced with a default interface of the plurality of available interfaces after the step of transmitting has been completed.

When a call is initiated from the customer line an access code is sent identifying one of the available interfaces from the customer line, and the customer line is interfaced to the available one of the interfaces identified by the access code. Sending the access code includes the steps of automatically interfacing the customer telephone line with a preselected default one of the plurality of available interfaces to enable transmission of the access code, and transmitting the access code through the default interface. On the other band when the call is to the customer line to activate the meter the interfacing is preferably by use of a suppressed ringing protocol to interconnect the consumption meter with the information collection computer.

The preferred embodiment of the automatic metering information collecting system of the present invention an information collecting computer connectable to a local multiport telecommunications switch that services the customer telephone line connected with the at least one consumption meter, means for sending an interface selection message from the information collecting computer to the local multiport switch representative of a selected one interface of a plurality of different types of available interfaces, means for selectively interfacing the customer telephone line connected with the at least one consumption meter to the information collecting computer through the one selected interface represented by the interface selection message, and means for transmitting customer metering information from the at least one consumption meter through the one selected interface to the information collecting computer.

Preferably, the interfacing means includes a selection switch connected with the different types of available interfaces and having means for receiving a control signal and means responsive to the control signal to actuate the switch to selectively switch the selected one interface into a circuit with the customer line to interface the customer telephone line with the metering information collection computer. The control signal responsive means includes means for selectively switching all the remaining interfaces of the plurality of available interfaces other than the one selected interface out of circuit between the customer telephone line and the local multiport switch when the selection switch is actuated.

BRIEF DESCRIPTION OF THE DRAWINGS

The foregoing advantageous features of the automatic metering information collecting method and system of the present invention will be explained in greater detail and other advantageous features will be made apparent in the following detailed description of the preferred embodiment of the invention which is given with reference to the several figures of the drawing, in which.

DETAILED DESCRIPTION

Figure 1A:
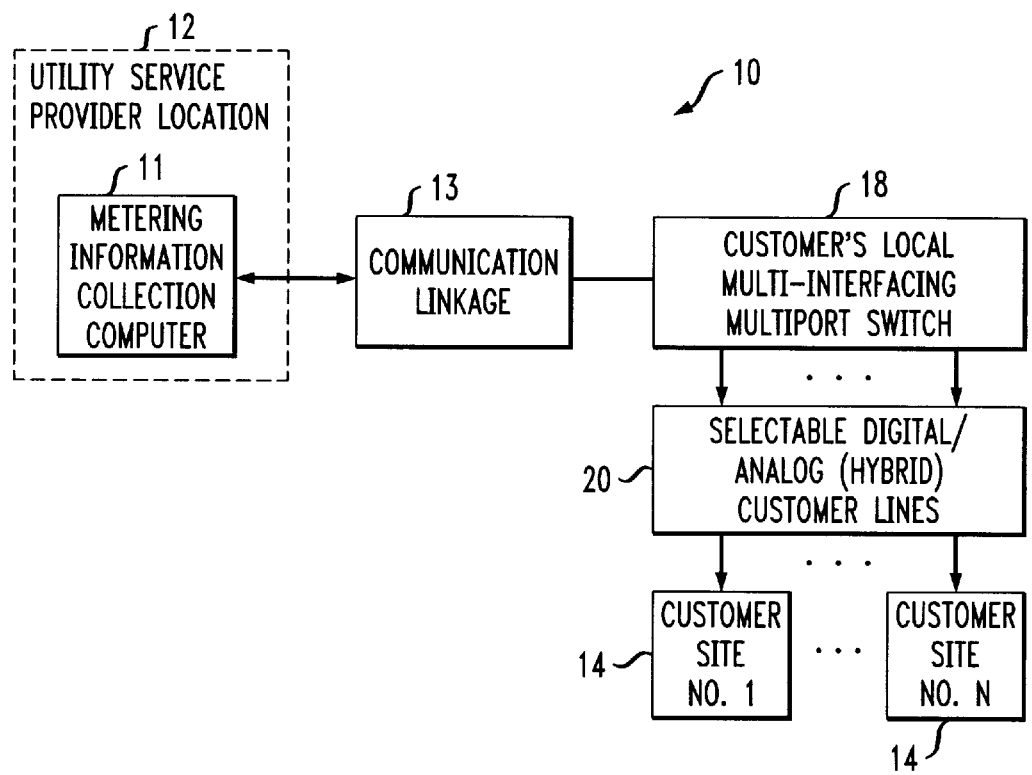
FIG. 1A is a functional block diagram of the preferred embodiment of the remote automatic metering information collecting system of the present invention.
Figure 1B:
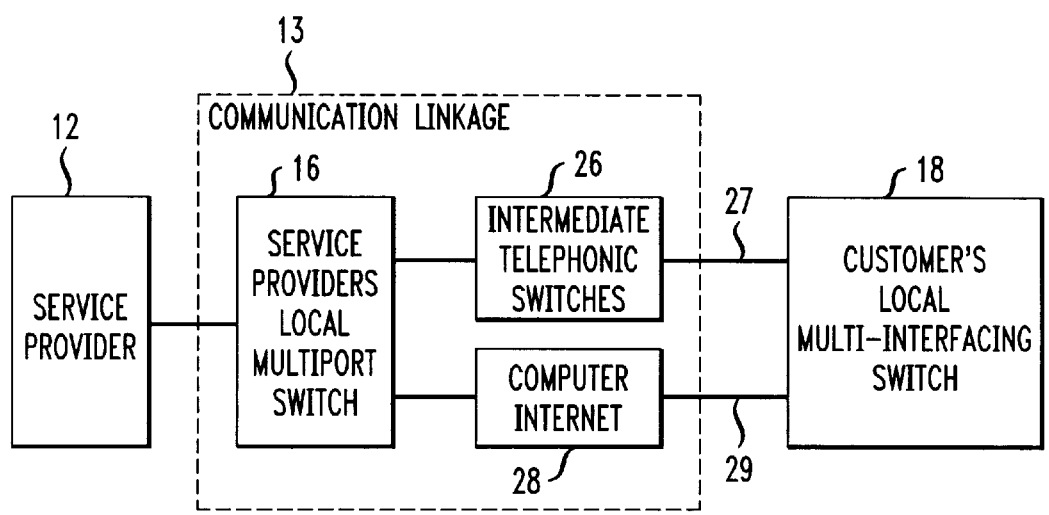
FIG. 1B is a functional block diagram of the preferred form of the communication linkage shown as only a single functional block in FIG. 1A.

Referring to FIGS. 1A and 1B, the preferred embodiment of the automatic metering information collection system 10 of the present invention is seen to include a metering information collection computer 11 at a remote location of a utility service provider 12 connected with a customer's local multi-interfacing multiport switch 18 through a communication linkage 13. The customer's local multi-interfacing multiport switch 18, in turn, is connected to a plurality of customer sites 14, numbered one through N, by a plurality of selectable digital/analog, or hybrid, customer lines, respectively.

The service provider 12, such as a natural gas or electrical service provider, communicates with their automatic meter reading equipment located at customer sites 14. The service provider 12 is connected with multiport, telephonic switch of the network 10 closest to the location of the service provider 12 which is referred to herein as the service provider's local, multiport switch, or service provider's switch, 16. Likewise, the multiport telephonic switch of the network 10 that is closest to the customer site or sites 14 under consideration is designated as the customer's local, multi-interfacing, multiport switch, or customer's local switch, 18. The customer's local switch, unlike conventional multiport switches is connected to the customer's equipment at the customer sites via at least some selectable digital/analog telecommunication lines as well as by conventional fixed digital lines 22 and conventional fixed analog lines 24. Alternatively and preferably, all of the lines of the selectable digital/analog lines.

In any event, the selectable digital/analog lines 20, under control of the customer's local switch and in response to messages from the service provider, are selectively, alternatively, operated as digital lines sometimes and operated as analog lines at other times. Preferably, the service provider's local switch 16 and the customers' local switch 18 are capable of being communication linked both conventionally by means of intermediate telephonic switches 26 at an input 27 and, preferably also via a computer internet 28 coupled to an input 29, preferably the world wide web computer network, referred to as the internet. While only a representative one customer's local switch is shown for purposes of simplicity, it should be appreciated that in the preferred embodiment of the telecommunications network 10, there are a plurality of local multiport switches distributed around the service area of the network 10, and preferably all, or at least some, of the local multiport switches are multi-interfacing multiport switches substantially like the customer's local multi-interfacing multiport switch 18.

Figure 2:
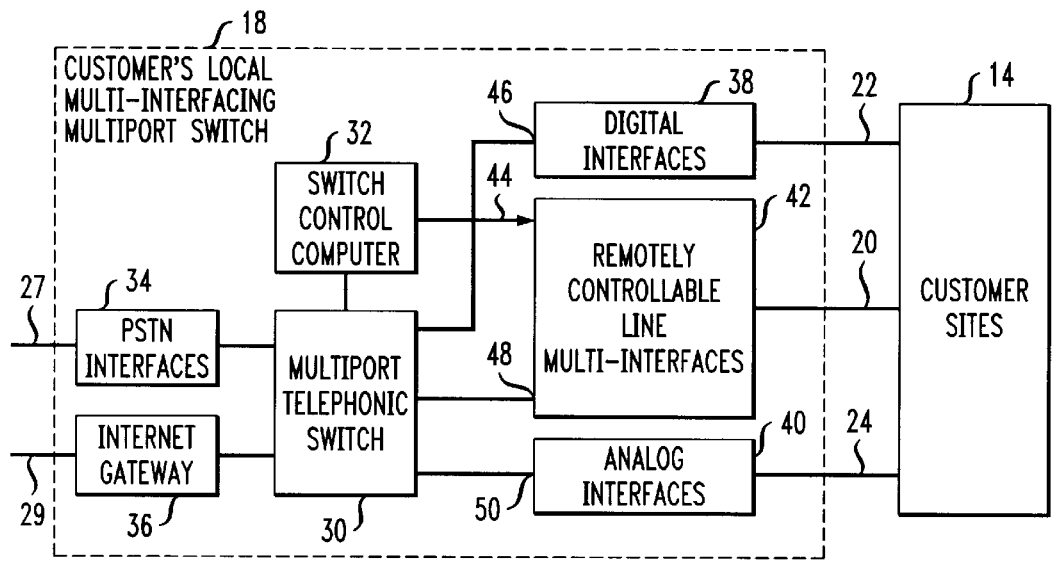
FIG. 2 is a detailed functional block diagram of the preferred form of the customer's local, multi-interfacing, multi-port switch previously shown only as a single functional block in FIG. 1.

Referring now to FIG. 2, the preferred embodiment of the customer's local, multi-interfacing, multiport switch 18, has a multi-port telephonic switch 30 that is controlled by a switch control computer 32. The telecommunication signals at 27 and 29 from the intermediate telephonic switches 26 and the computer internet 28 are respectively applied to a PSTN interface 34 and an internet gateway switch, or internet gateway, 36 for open communications through the internet. The digital lines 22 are obtained from digital interface 38; the analog lines 24 are obtained from analog interface 40 and the selectable digital/analog lines 20 are obtained from a remotely controllable line multi-interface 42 of the present invention. The switch control computer 32 controls the remotely controllable line multi-interface via a control signal applied to an input 44. The multi-port telephonic switch 30 has pluralities of input/output, or I/O, line ports respectively coupled to switch I/O ports 46, 48 and 50 of the digital interface 38, the remotely controllable line multi-interface 42 and the analog interface 40.

Figure 3:
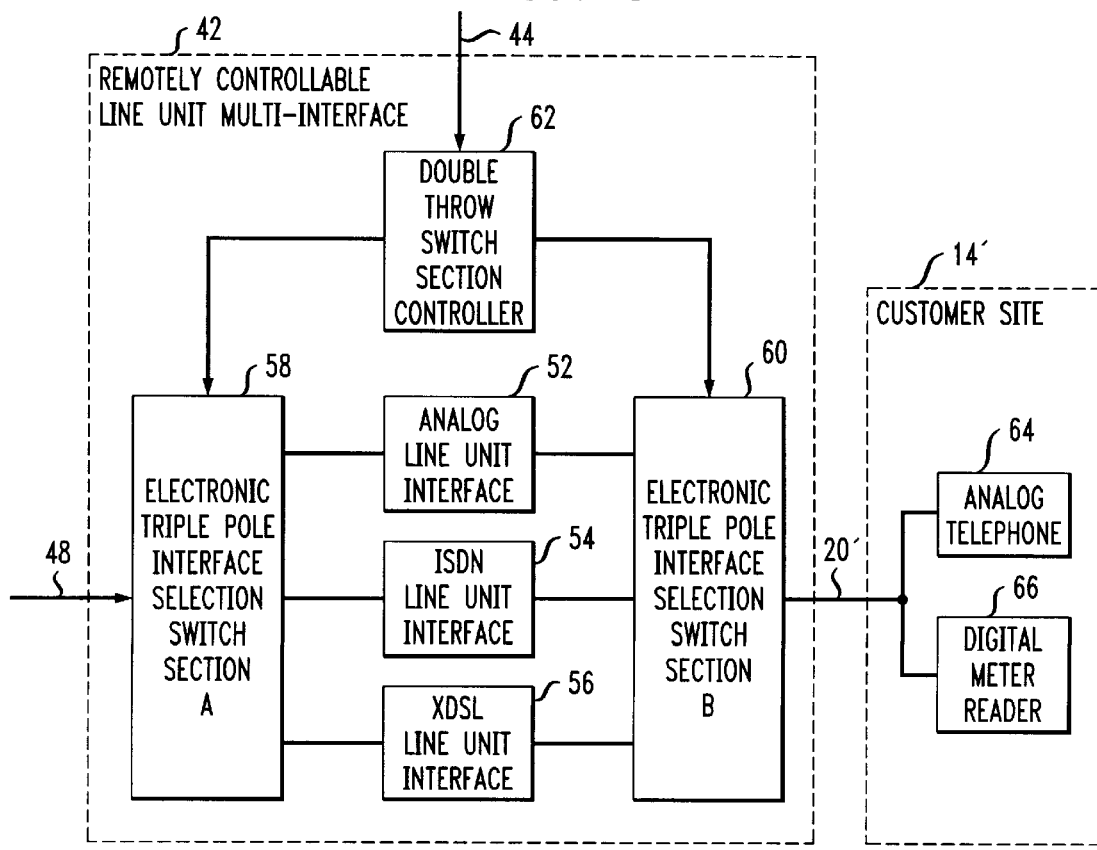
FIG. 3 is a functional block diagram of the remotely controllable line unit multi-interface previously shown only as a single functional block is FIG. 5.

Referring to FIG. 3, the preferred embodiment of the remotely controllable line unit multi-interface 42 is shown with reference to a single customer site 14' as representative example of the plurality of customer sites 14 having a dedicated single customer line 20' of the plurality of customer lines 20. The multi-interface includes three interfaces for interfacing different types of telecommunication signals between the multiport telephonic switch and the customer's equipment at the customer site: an analog line unit interface 52 for providing analog service on the selectable digital/analog lines, an ISDN line unit interface 54 for providing ISDN digital service for both voice and data and an XDSL line unit interface 56 for providing XDSL digital service. XDSL defines a set of Digital Subscriber Line (DSL) technologies over twisted pair copper local loop facilities. XDSL technologies are developed to increase the bandwidth over embedded copper loop plant and are primarily focused on data transport.

The plurality of interfaces 52, 54 and 56 are connected in parallel between the switch port 48 and the customer line 20' via a pair of substantially identical, electronic triple-pole switch sections 58 and 60: electronic triple-pole interface selection switch section A and electronic triple-pole interface selection switch section B, respectively. Switch sections 58 and 60 are both controlled by a double-throw switch section controller 62 to define an electronic triple-pole, double-throw switch. Both switch section 58 and 60 have three switch states, or switch positions, respectively associated with the analog line unit interface 52, the ISDN line unit interface 54 and the XDSL line unit interface 56. When the switch sections 58 and 60 are both in the first, second and third switch positions, the line unit interfaces 52, 54 and 56 are connected in circuit between the I/O switch port 48 and the customers selectable digital/analog line 20' to interface the types of signals to which the particular interface is adapted. Only one of the plurality of line unit interfaces is selectable for connection at any one time, and when one of the plurality of line unit interfaces has been selected, then the other two interfaces are both disconnected from both the customer line 20' and the multiport telephonic switch 30 through the switch port 48. The double throw-switch section controller 62 causes both switch sections to change between their corresponding positions, simultaneously.

The optimum advantage is obtained from the invention when the customer site 14' has at least two different signaling types of telephonic equipment: digital and analog, such as the illustrative analog telephone 64 and a digital meter reader 66 at customer site 14'.

The triple-pole, double-throw switch defined by switch elements 58, 60 and 62 is used to selectively, alternatively, couple the plurality of different line unit interfaces 52, 54 and 56 to a single one 20' of the plurality of telecommunication lines 20 to respectively enable communication via the different types of telecommunication signals to which the line unit interfaces 52, 54 and 56 are adapted on the single customer telecommunication line 20'. As previously noted, preferably this is performed with respect to all of the plurality of customer telecommunication lines.

The position of the switch is determined by the controller 62 which, in turn, responds to control signals from the switch control computer 32 provided at control input 44 of the switch controller 62. The switch control computer 32, in turn, has a control program that is responsive to messages received through at least one and preferably both the intermediate telephonic switches 26 of the network 10 and the computer internet 28, and to information initiated from the customer site to control to control the double-throw switch section controller 62.

Preferably, the switch section controller 62 is caused to automatically switch the telecommunication line 20' to a preselected default one of the plurality of different line unit interfaces 52, 54 and 56 in the absence of receipt of a control message, an access code or other conditions indicating that another one of the plurality of different line unit interfaces 52, 54 and 56 is to be selected.

Generally, in accordance with the invention, the preferred preselection of the default interface is the one that is used most often, and this should generally can be assumed to be service required by the customers voice telephone in the absence of other information. Thus, in the case of the exemplary customer site 14', in which both an analog telephone 64 and a digital meter reader are on the same line 20', the double-through switch section controller 62 would be caused to switch the analog line interface 52 into the line 20' automatically when it is not receiving a signal to switch to one of the two other digital interfaces 54 and 56.

Also, preferably the customer line is automatically switched to preselected default one of the plurality of different line unit interfaces associated with the voice telephone when the telephone goes "off-hook" to originate a call from the customer line 20'. Calls initiated by customers equipment, although starting with the default preselected interface in response to call origination from the customer's line 20', are switched to another one of the interfaces in response to an access code from the customer's telephonic equipment. Upon receipt of the access code, the switch control computer 32 sends a control signal to the remotely controllable line multi-interface 42 to cause it to switch the customer line 20' from the default interface to another one of the interfaces associated with and identified by the access code.

Figure 4A:
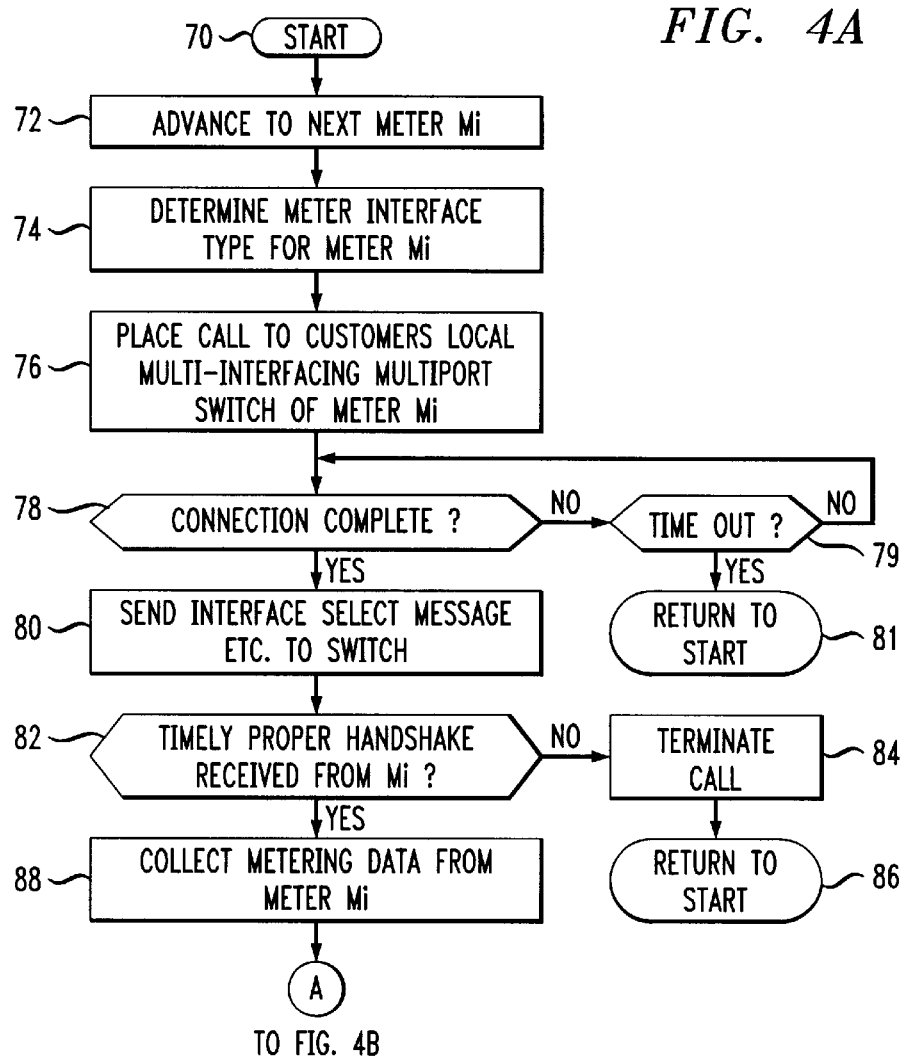
FIGS. 4A and 4B form a composite logic flow chart of the steps of the preferred method of automatically collecting metering information performed by the service utility providers metering information collection computer.
Figure 4B:
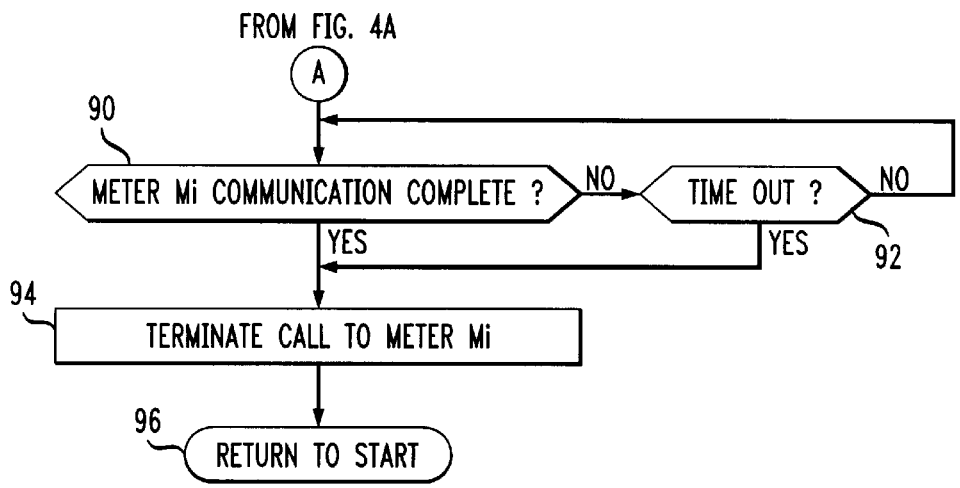

Referring to FIGS. 4A and 4B, the metering information collection computer 11 is programmed to function substantially automatically to poll the meters at the plurality of customer sites 14. The computer 11 includes a memory containing a list of all the meters together with an indication for each one of the meters of the type of interface required to communicate with the meter and the telephone number of the customer line to which the meter is connected.

After the program start 70, in step 72 the program advances to the next meter Mi, which initially is the first meter on the list. Nest, in step 74, a determination is made of the meter interface type needed for the meter under consideration Mi. In step 76, a call is then made to the customer's local multi-interfacing multiport switch of the meter Mi. After a connection is made during step 78 within a preselected time, in step 80, the computer sends an appropriate interface select message to the customer's local switch 18. If a connection is not made in a timely manner as determined in step 79, then the program returns to start 70 in step 81.

After the connection has been made, a determination is made as to whether there has been timely proper handshake message received from the meter Mi in step 82, if not then in step 84, the call is terminated and in step 86 the program returns to start. If a proper hand shake is received from the meter, then the computer 11 collects the data transmitted from the meter Mi in step 88.

Turning to FIG. 4B, in step 90, when the computer receives an indication from the meter that the communication of metering data has been completed, it passes to step 94 at which the call to the meter Mi is terminated and then in step 96 the program returns to start. If no indication of completion of the communication from the meter is received within a preselected time period, then in step 92 the program also proceeds to step 94 to terminate the call and return to start to begin the process with the next meter on the list.

Figure 5:
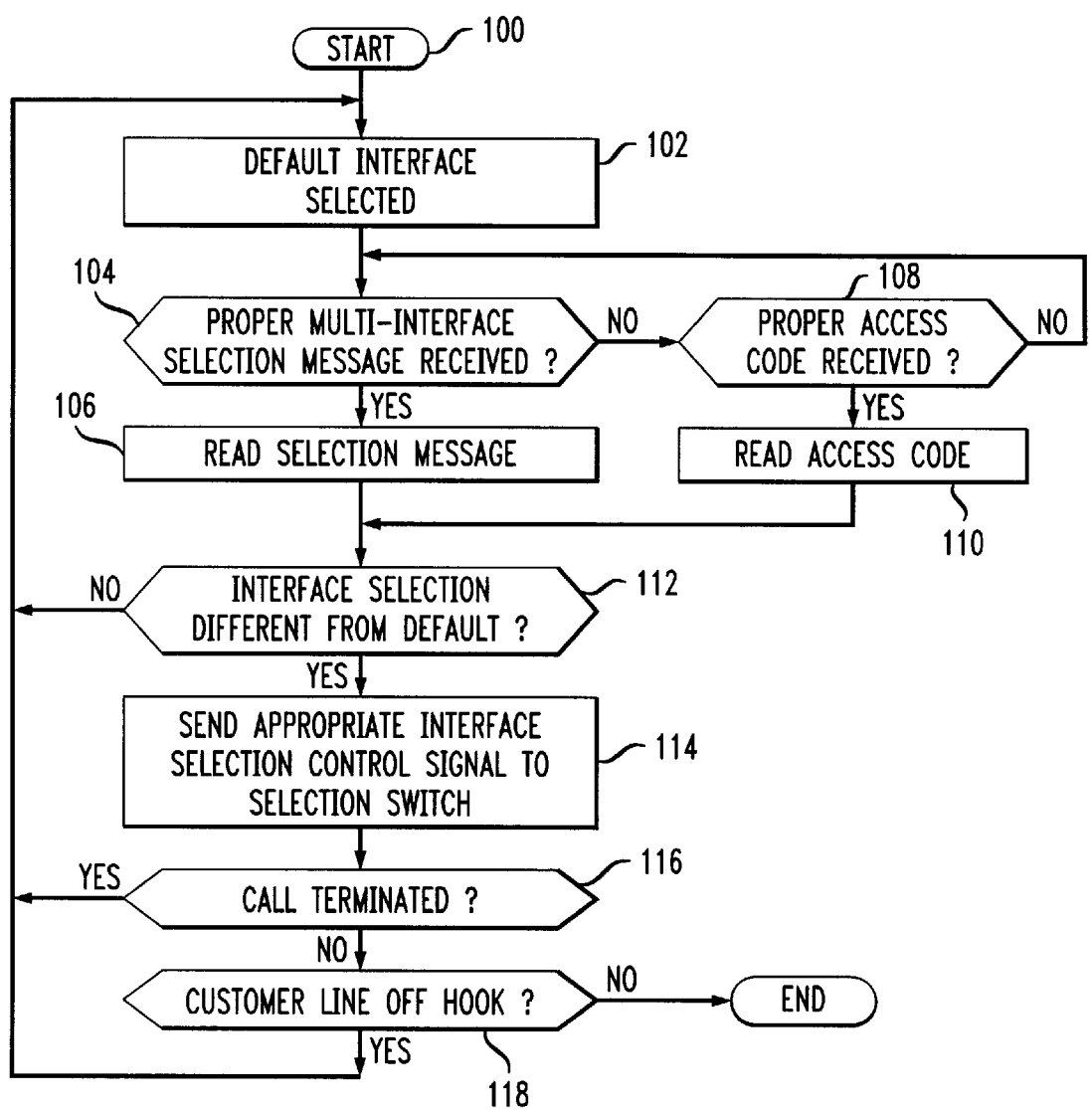
FIG. 5 is a logic flow chart of the steps of the preferred method of automatically collecting metering information performed by the computer and other elements of the system located at the customers local multi-interfacing multiport switch.

The computer 11 communicates with the remotely controllable line unit multi-interface 42, FIG. 3, to control the selection of the interface of the meters with the switch during the transmission of telemetering data in accordance with a control program at the switch 18 as shown in FIG. 5. After the start at step 100, a default interface is selected for each of the customer hybrid telephone lines in step 102. This default interface is preselected and preferably is the interface that is required by the customer's other telephonic equipment, such the customer's voice telephone. In step 104, if a proper multi-interface selection message is received by the customer's local switch 18, then the interface selection in the message is read in step 106. If no message is received, then in step 108 a determination is made as to whether a proper access code has been received from the customer's telephone line. If a proper access code is received, then in step 110 the access code is read. After the steps 106 and 108, a determination is made as to whether the interface that has been indicated for selection is different from the default interface for the meter in step 112. If the indicated interface is the same as the default interface that is already coupled with the customer line, then the program returns to step 102 and the default interface remains selected. If, on the other hand, the interface indicated for selection is other than the default interface, then in step 114, an appropriate interface selection control signal is sent to the input 44 of the double throw switch section controller 62, FIG. 3, to switch in the selected interface one of the interfaces 52, 54 and 56. After the call to the meter is determined to have been completed in step 116, the program returns to step 102 to return to the default interface. Likewise, if it is determined that the customer line has gone off hook in step 118 to initiate a call, then the communication with the meter is interrupted, the customer line is switched back to the default interface in step 102.

While a particular and preferred embodiment has been disclosed for purposes of illustrating the invention, it should be appreciated that the scope of the invention is not limited to these particular details but is defined by the appended claims.

What is claimed is:

1. A method of automatically collecting metering information from at least one consumption meter of a plurality of remote consumption meters individually located at and respectively connected with customer telephone lines at a plurality of different customer locations, comprising the steps of:

connecting a metering information collecting computer to a local multiport telecommunications switch that services the customer telephone line connected with the at least one consumption meter;

sending from the information collecting computer an interface selection message to the local multiport switch representative of a selected one interface of a plurality of different types of available interfaces;

interfacing the customer telephone line connected with the at least one consumption meter to the information collecting computer through the one selected interface represented by the interface selection message; and transmitting customer metering information from the at least one consumption meter through the one selected interface to the information collecting computer.

2. The method of claim 1 in which the step of connecting includes the step of placing a call from the metering information collection computer to the customer telephone line.

3. The method of claim 1 in which the step of connecting includes the step of establishing a communications link between the local multiport switch and the metering information collecting computer through a computer internet.

4. The method of claim 3 in which the computer internet is the world wide web internet.

5. The method of claim 1 in which the different types of available interfaces from which one is selected include an analog interface and a digital interface.

6. The method of claim 1 in which the different types of available interfaces from which one is selected include two different types of digital interfaces.

7. The method of claim 6 in which the different types of digital interfaces include an ISDN digital interface and an XDSL digital interface.

8. The method of claim 1 in which the step of interfacing includes the steps of receiving a control signal at a selection switch connected with the different types of available interfaces, and responding to the control signal to actuate the switch to selectively switch the selected one interface into a circuit with the customer line to interface the customer telephone line with the metering information collection computer.

9. The method of claim 8 in which the step of responding includes the step of selectively switching the selected one interface between the customer telephone line and the local multiport switch when the selection switch is actuated.

10. The method of claim 8 in which the step of responding includes the step of selectively switching all the remaining interfaces of the plurality of available interfaces other than the one selected interface out of circuit between the customer telephone line and the local multiport switch when the selection switch is actuated.

11. The method of claim 1 including the step of automatically interfacing the customer line with a default interface of the plurality of available interfaces after the step of transmitting has been completed.

12. The method of claim 11 in which the step of automatically interfacing the customer line with the default interface includes the steps of preselecting the default interface from the plurality of interfaces available, storing the identity of the default interface that has been preselected, and switching the default interface into circuit with the customer line in lieu of the selected interface after conclusion of the step of transmitting if the selected interface has an identity other than the identity of the default interface.

13. The method of claim 1 including the steps of sending an access code identifying one of the available interfaces from the customer line when a call is initiated from the customer line, and interfacing the customer telephone line to the available one of the interfaces identified by the access code.

14. The method of claim 13 in which the step of sending an access code includes the steps of automatically interfacing the customer telephone line with a preselected default one of the plurality of available interfaces to enable transmission of the access code, and transmitting the access code through the default interface.

15. The method of claim 1 in which the steps of connecting, sending, interfacing and transmitting are successively performed with respect to a succession of the plurality of remote consumption meters.

16. The method of claim 1 in which the step of interfacing includes the step of using a suppressed ringing protocol to interconnect the consumption meter with the information collection computer.

17. The method of claim 1 in which the consumption meter is capable of communicating with the information collecting computer only through a predetermined one of the available interfaces, and the step of sending an interface selection message includes the step of sending an interface selection message to select the predetermined one of the interfaces needed to enable communication with the information collection computer.

18. A system for automatically collecting metering information from at least one consumption meter of a plurality of remote consumption meters individually located at and respectively connected with customer telephone lines at a plurality of different customer locations, comprising:

a metering information collecting computer connectable to a local multiport telecommunications switch that services the customer telephone line connected with the at least one consumption meter;

means for sending an interface selection message from the information collecting computer to the local multiport switch representative of a selected one interface of a plurality of different types of available interfaces;

means for selectively interfacing the customer telephone line connected with the at least one consumption meter to the information collecting computer through the one selected interface represented by the interface selection message; and means for transmitting customer metering information from the at least one consumption meter through the one selected interface to the information collecting computer.

19. The system of claim 1 in which the interfacing means includes a selection switch connected with the different types of available interfaces and having means for receiving a control signal, and means responsive to the control signal to actuate the switch to selectively switch the selected one interface into a circuit with the customer line to interface the customer telephone line with the metering information collection computer.

20. The system of claim 8 in which the control signal responsive means includes means for selectively switching all the remaining interfaces of the plurality of available interfaces other than the one selected interface out of circuit between the customer telephone line and the local multiport switch when the selection switch is actuated.

21. The system of claim 18 including means for automatically interfacing the customer line with a default interface of the plurality of available interfaces after transmission by the meter has been completed.

22. The system of claim 18 in which the means for automatically interfacing the customer line with the default interface includes the steps of means for preselecting the default interface from the plurality of interfaces available, means for storing the identity of the default interface that has been preselected, and means for switching the default interface into circuit with the customer line in lieu of the selected interface after the meter has concluded transmission, if the selected interface has an identity other than the identity of the default interface.

23. The system of claim 1 in which the interfacing means includes means for interfacing the customer telephone line to an available one of the interfaces identified by an access code from the customer line.

24. The system of claim 1 in which the metering information collecting computer includes means for controlling the connecting means, the means for sending, the means for interfacing and the means for transmitting to perform successively with respect to a succession of the plurality of the meters.

* * * * *